US012006890B1

(12) United States Patent
Okamura

(10) Patent No.: US 12,006,890 B1
(45) Date of Patent: Jun. 11, 2024

(54) FUEL SUPPLY DEVICE

(71) Applicant: TOYOTA JIDOSHA KABUSHIKI KAISHA, Toyota (JP)

(72) Inventor: Seiji Okamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/396,698

(22) Filed: Dec. 27, 2023

(30) Foreign Application Priority Data

Jan. 19, 2023 (JP) ................................ 2023-006481

(51) Int. Cl.

*F02D 41/38* (2006.01)
*F02D 41/14* (2006.01)
*F02D 41/22* (2006.01)
*F02D 1/00* (2006.01)
*F02D 41/30* (2006.01)

(52) U.S. Cl.

CPC ..... *F02D 41/3854* (2013.01); *F02D 41/1438* (2013.01); *F02D 41/222* (2013.01); *F02D 2001/009* (2013.01); *F02D 41/3082* (2013.01); *F02D 2250/31* (2013.01)

(58) Field of Classification Search

CPC ............. F02D 41/3854; F02D 41/1438; F02D 41/3082; F02D 2001/009; F02D 2250/31; F02D 41/222; F02D 41/042; B60K 6/22; B60K 6/442

See application file for complete search history.

(56) References Cited

U.S. PATENT DOCUMENTS 7,025,050 B2 * 4/2006 Oono .................. F02D 41/3836 123/690
2009/0082941 A1 * 3/2009 Nakata ................. F02M 57/005 123/457
2012/0255521 A1 * 10/2012 Aoki .................. F02M 63/0245 123/447

FOREIGN PATENT DOCUMENTS

JP 2016130475 A 7/2016

* cited by examiner

*Primary Examiner* — Syed O Hasan

(57) ABSTRACT

Upon receiving a request to stop an internal combustion engine, processing circuitry of a fuel supply device opens a relief valve by increasing a fuel pressure in a delivery pipe to a specified pressure or greater before stopping the internal combustion engine. The processing circuitry determines whether a fuel pressure sensor is normal based on a result of comparison between a fuel pressure in the delivery pipe detected by the fuel pressure sensor and a fuel pressure determination value after the fuel pressure in the delivery pipe starts to decrease as a result of opening the relief valve.

3 Claims, 4 Drawing Sheets

FUEL SUPPLY DEVICE

BACKGROUND

1. Field

The present disclosure relates to a fuel supply device configured to determine whether a fuel pressure sensor that detects the pressure of fuel supplied to a fuel injection valve of an internal combustion engine is normal.

2. Description of Related Art

Japanese Laid-Open Patent Publication No. 2016-130475 discloses an example of a fuel supply device including a fuel injection valve, a delivery pipe, a fuel pump, and a fuel pressure sensor. The fuel pump pressurizes fuel and forcibly delivers it to the delivery pipe. A fuel injection valve is connected to the delivery pipe. The fuel injection valve injects the fuel that has been supplied from the delivery pipe. The fuel pressure sensor detects a fuel pressure in the delivery pipe.

The fuel supply device functions to determine whether the fuel pressure sensor is abnormal. Specifically, the device determines whether the fuel pressure sensor is abnormal based on the result of comparison between a detection value of the fuel pressure sensor and a predetermined threshold value when at least one of the condition that the duration during which the internal combustion engine is off is greater than or equal to a predetermined time and the condition that the temperature of coolant in the internal combustion engine is less than or equal to a predetermined temperature is satisfied.

When the duration during which the internal combustion engine is off has not reached the predetermined time and the temperature of coolant is higher than the predetermined temperature at the start of the internal combustion engine, the above determination cannot be performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a fuel supply device configured to supply fuel to an internal combustion engine. The fuel supply device includes a fuel injection valve configured to inject the fuel supplied to the internal combustion engine, a delivery pipe configured to store the fuel supplied to the fuel injection valve, a fuel pump configured to pressurize the fuel and forcibly deliver the fuel to the delivery pipe, a relief valve configured to open in response to a fuel pressure in the delivery pipe becoming greater than or equal to a specified pressure, thereby allowing the fuel in the delivery pipe to flow out, a fuel pressure sensor configured to detect a fuel pressure in the delivery pipe, and processing circuitry. The fuel pressure in the delivery pipe based on an output signal of the fuel pressure sensor is a fuel pressure detection value. Upon receiving a request to stop the internal combustion engine, the processing circuitry is configured to open the relief valve by increasing the fuel pressure in the delivery pipe to the specified pressure or greater before stopping the internal combustion engine and determine whether the fuel pressure sensor is normal based on a result of comparison between the fuel pressure detection value and a fuel pressure determination value after the fuel pressure in the delivery pipe starts to decrease as a result of opening the relief valve.

Other features and aspects will be apparent from the following detailed description, the drawings, and the claims.

Other features and aspects will be apparent from the following detailed description, the drawings, and the claims.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a fuel supply device 20 according to an embodiment will be described with reference to FIGS. 1 to 4.

Figure 1:
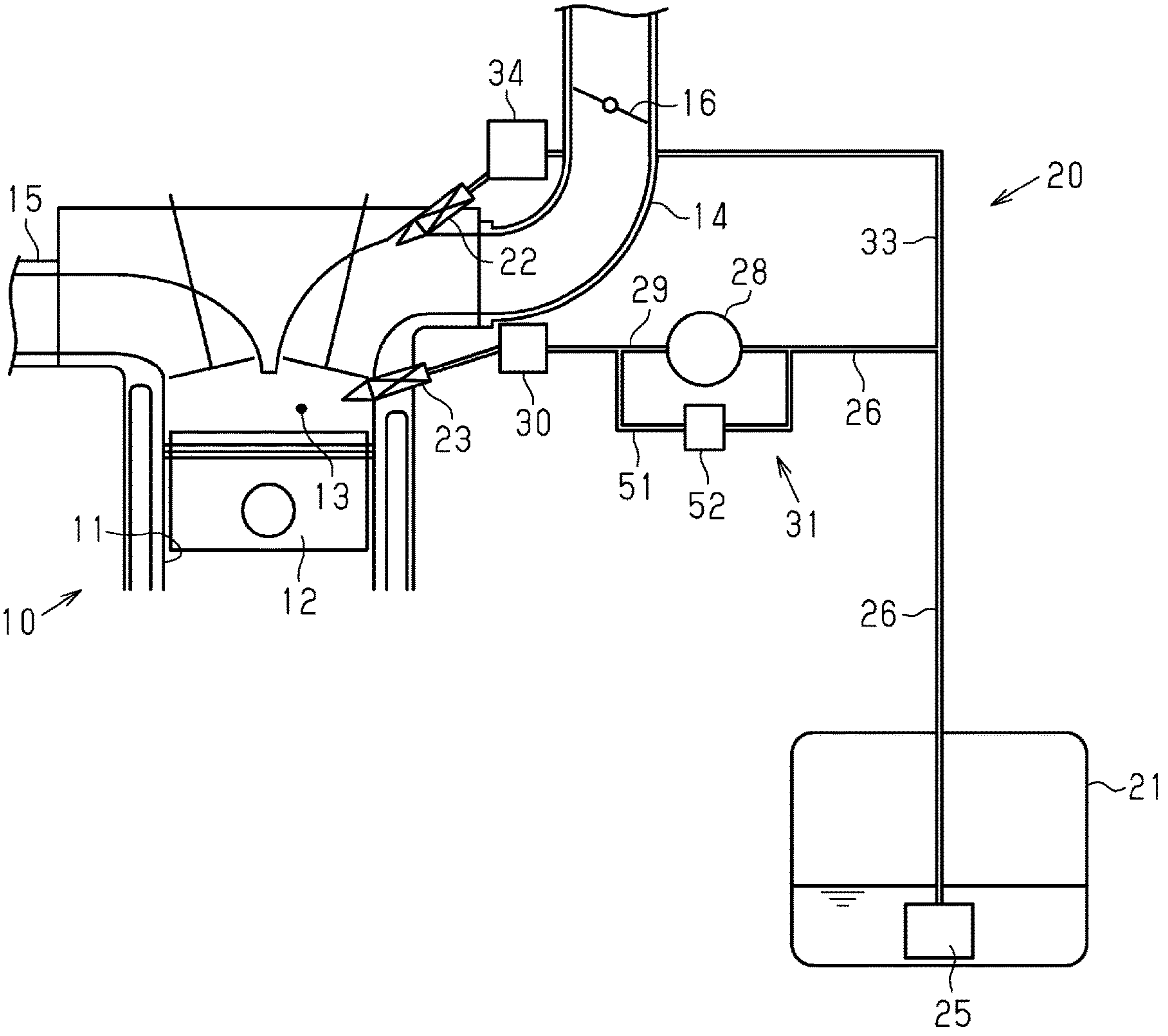
FIG. 1 is a diagram schematically showing a fuel supply device of an embodiment and an internal combustion engine to which fuel is supplied from the fuel supply device.

FIG. 1 illustrates an internal combustion engine 10 mounted on a vehicle and a fuel supply device 20 that supplies fuel to the internal combustion engine 10.

Internal Combustion Engine

The internal combustion engine 10 includes cylinders 11. FIG. 1 shows only one of the cylinders 11. In each of the cylinders 11, a piston 12 is accommodated so as to be able to reciprocate, and a combustion chamber 13 is defined by the piston 12. In the combustion chambers 13, an air-fuel mixture containing fuel and air is combusted. An intake passage 14 and an exhaust passage 15 are connected to the combustion chambers 13. Air is introduced into the combustion chambers 13 through the intake passage 14. The intake passage 14 is provided with a throttle valve 16 that adjusts an intake air amount, which is an amount of air introduced into the combustion chamber 13 from the intake passage 14. The exhaust gas generated in the combustion chamber 13 is discharged to the exhaust passage 15.

Fuel Supply Device

As shown in FIG. 1, the fuel supply device 20 includes a fuel tank 21 and one or more fuel injection valves that inject fuel supplied to the internal combustion engine 10. The fuel tank 21 stores fuel supplied to the internal combustion engine 10. The fuel supply device 20 includes a port injection valve 22 and a direct injection valve 23 as fuel injection valves. One port injection valve 22 and one direct injection valve 23 are provided for one cylinder 11. The port injection valve 22 injects fuel into a portion of the intake passage 14 downstream of the throttle valve 16. The direct injection valve 23 injects fuel into the combustion chamber 13.

Figure 2:
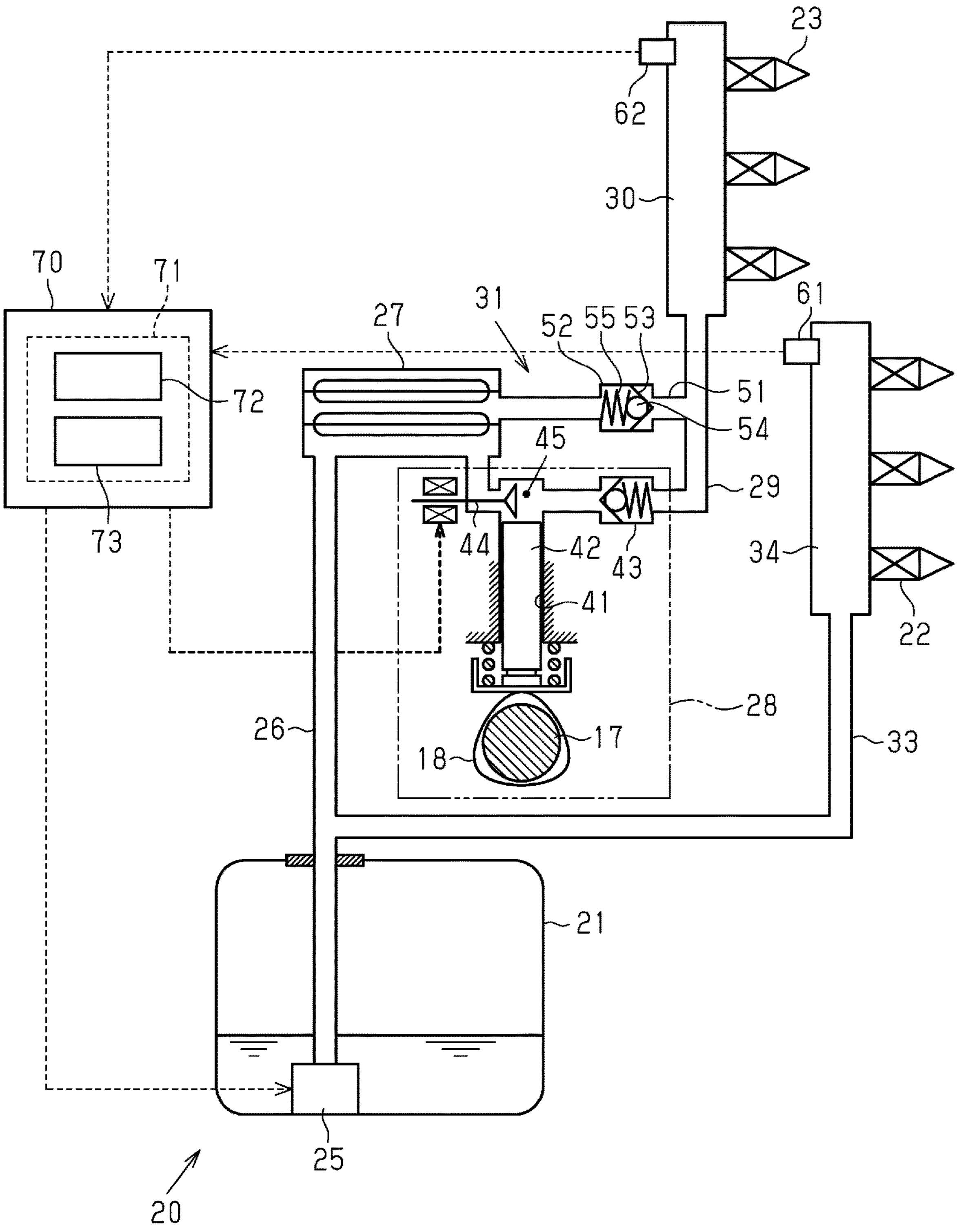
FIG. 2 is a diagram schematically showing the fuel supply device of FIG. 1.

As shown in FIG. 2, the fuel supply device 20 includes a feed pump 25, a supply passage 26, a high-pressure fuel pump 28, a forced delivery passage 29, a high-pressure delivery pipe 30, and a relief mechanism 31. The feed pump 25 is an electric pump that draws fuel from the fuel tank 21 and discharges the fuel to the supply passage 26. Fuel is supplied to a high-pressure fuel pump 28 through the supply passage 26. The supply passage 26 is provided with a pulsation damper 27. The pulsation damper 27 reduces pulsation of the fuel flowing through the supply passage 26. The fuel flowing through the supply passage 26 is supplied to the high-pressure fuel pump 28 through the pulsation damper 27.

The high-pressure fuel pump 28 pressurizes the fuel that has been supplied from the supply passage 26 and discharges the pressurized fuel to the forced delivery passage 29. The forced delivery passage 29 guides the fuel discharged from the high-pressure fuel pump 28 to the high-pressure delivery pipe 30. That is, the high-pressure fuel pump 28 pressurizes the fuel and forcibly delivers it to the high-pressure delivery pipe 30. The direct injection valves 23 are connected to the high-pressure delivery pipe 30. The high-pressure delivery pipe 30 stores fuel supplied to the direct injection valves 23. The relief mechanism 31 is configured to cause the fuel in the high-pressure delivery pipe 30 to flow out of the high-pressure delivery pipe 30. Configurations of the high-pressure fuel pump 28 and the relief mechanism 31 will be described later.

The fuel supply device 20 further includes a branch passage 33 and a low-pressure delivery pipe 34. The branch passage 33 guides some of the fuel flowing through the supply passage 26 to the low-pressure delivery pipe 34. Specifically, the branch passage 33 is connected to a portion of the supply passage 26 downstream of the pulsation damper 27. The port injection valves 22 are connected to the low-pressure delivery pipe 34. The low-pressure delivery pipe 34 stores fuel supplied to the port injection valves 22.

High-Pressure Fuel Pump

The high-pressure fuel pump 28 includes a cylinder 41, a plunger 42, a check valve 43, and a solenoid spill valve 44. The plunger 42 is provided inside the cylinder 41 so as to be able to reciprocate. When the cam 18 rotates integrally with the cam shaft 17 of the internal combustion engine 10, the plunger 42 reciprocates in the cylinder 41. A pressurizing chamber 45 is defined in the cylinder 41 by the plunger 42. The high-pressure fuel pump 28 pressurizes the fuel supplied through the supply passage 26 in the pressurizing chamber 45. The check valve 43 is provided in a passage connecting the pressurizing chamber 45 to the forced delivery passage 29. The check valve 43 closes when the fuel pressure in the pressurizing chamber 45 is lower than the fuel pressure in the forced delivery passage 29, thereby preventing the backflow of fuel from the forced delivery passage 29 to the pressurizing chamber 45. The check valve 43 opens when the fuel pressure in the pressurizing chamber 45 is higher than the fuel pressure in the forced delivery passage 29, thereby allowing the fuel to flow out from the pressurizing chamber 45 to the forced delivery passage 29. The solenoid spill valve 44 opens and closes in response to energization, thereby selectively allowing and blocking the flow of fuel between the supply passage 26 and the pressurizing chamber 45.

The fuel pressurizing operation of the high-pressure fuel pump 28 will now be described. In the high-pressure fuel pump 28, the volume of the pressurizing chamber 45 changes in accordance with the reciprocation of the plunger 42 in the cylinder 41. Hereinafter, the operation of the plunger 42 in the direction in which the volume of the pressurizing chamber 45 increases is referred to as "downward movement of the plunger 42," and the operation of the plunger 42 in the direction in which the volume of the pressurizing chamber 45 decreases is referred to as "upward movement of the plunger 42."

When the plunger 42 moves downward in a state in which the solenoid spill valve 44 is open, the volume of the pressurizing chamber 45 increases. As a result, the fuel flows from the supply passage 26 into the pressurizing chamber 45. When the solenoid spill valve 44 is kept open even after the plunger 42 is switched from the downward movement to the upward movement, the fuel in the pressurizing chamber 45 is pushed back to the supply passage 26. When the solenoid spill valve 44 is closed during the upward movement of the plunger 42 and thereafter the solenoid spill valve 44 kept closed until the plunger 42 changes from the upward movement to the downward movement, the volume of the pressurizing chamber 45 is reduced in accordance with the upward movement of the plunger 42, thereby pressurizing the fuel in the pressurizing chamber 45. When the fuel pressure in the pressurizing chamber 45 exceeds the fuel pressure in the forced delivery passage 29, the check valve 43 opens. As a result, the fuel in the pressurizing chamber 45 is fed to the forced delivery passage 29. Thus, the high-pressure fuel pump 28 pressurizes the fuel supplied from the supply passage 26 and delivers the pressurized fuel to the forced delivery passage 29 every time the plunger 42 reciprocates. The fuel pressure in the high-pressure delivery pipe 30 is adjusted by changing the closing timing of the solenoid spill valve 44 during the upward movement of the plunger 42.

Relief Mechanism

The relief mechanism 31 includes a relief passage 51 and a relief valve 52. The relief passage 51 connects the forced delivery passage 29 and the supply passage 26 while bypassing the high-pressure fuel pump 28. The relief passage 51 has a first end connected to the forced delivery passage 29 and a second end connected to the pulsation damper 27 of the supply passage 26.

The relief valve 52 opens when the fuel pressure in the high-pressure delivery pipe 30 becomes greater than or equal to a specified pressure PDL, thereby allowing the fuel in the high-pressure delivery pipe 30 to flow out. The relief valve 52 is provided in the relief passage 51. The relief valve 52 includes a valve seat 53, a valve member 54, and a valve spring 55. When the valve member 54 is pressed against the valve seat 53 by an urging force of the valve spring 55, the relief valve 52 is closed. When the relief valve 52 is closed, the flow of the fuel in the relief passage 51 is regulated.

The fuel pressure in the high-pressure delivery pipe 30 acts on the valve member 54 in a direction in which the valve member 54 moves away from the valve seat 53. When the fuel pressure in the high-pressure delivery pipe 30 is less than the specified pressure PDL, the relief valve 52 is kept closed. As a result, the fuel in the high-pressure delivery pipe 30 is restricted from flowing out to the supply passage 26 through the relief passage 51. When the fuel pressure in the high-pressure delivery pipe 30 becomes greater than or equal to the specified pressure PDL, the valve member 54 is displaced apart from the valve seat 53 against the urging force of the valve spring 55. That is, the relief valve 52 is opened. As a result, the fuel in the high-pressure delivery pipe 30 flows out to the supply passage 26 through the relief passage 51.

Figure 3:
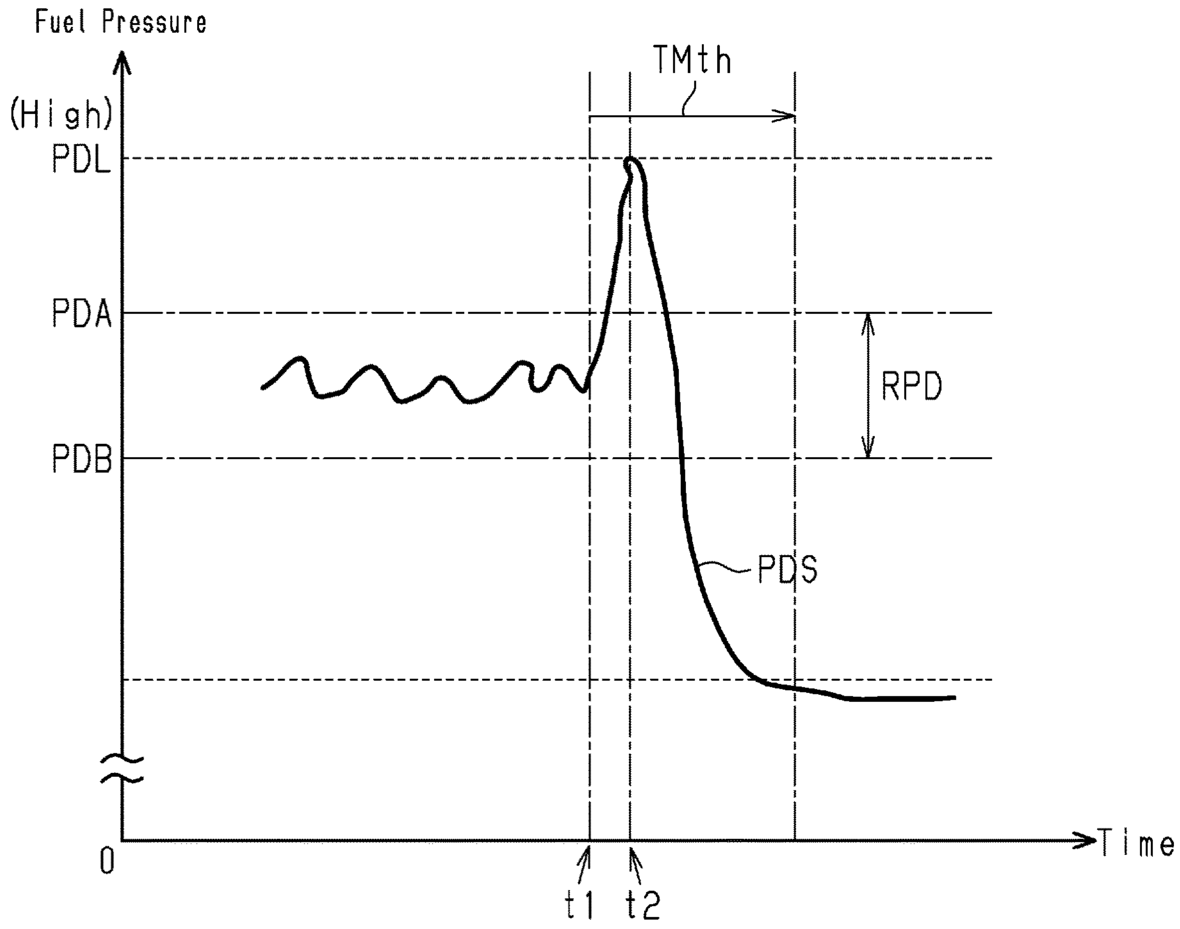
FIG. 3 is a graph illustrating characteristics of a relief valve included in the fuel supply device of FIG. 1.

The characteristics of the relief valve 52 will now be described with reference to FIG. 3. A fuel pressure range RPD in FIG. 3 is a range of the fuel pressure that is set while the internal combustion engine 10 is running. As shown in FIG. 3, the relief valve 52 is designed such that the specified pressure PDL is higher than the upper limit PDA of the fuel pressure range RPD. Thus, the relief valve 52 remains closed while the internal combustion engine 10 is running. Further, the fuel pressure range RPD is set such that the lower limit PDB of the fuel pressure range RPD is higher than a feed pressure. The feed pressure is a pressure of the fuel discharged from the feed pump 25 to the supply passage 26.

The high-pressure fuel pump 28 can make the fuel pressure in the high-pressure delivery pipe 30 higher than the upper limit PDA of the fuel pressure range RPD. When the fuel pressure in the high-pressure delivery pipe 30 becomes greater than or equal to the specified pressure PDL, the valve member 54 is separated from the valve seat 53. As a result, the relief valve 52 is opened. Then, the fuel in the high-pressure delivery pipe 30 passes through the relief valve 52 and flows out to the supply passage 26, so that the fuel pressure in the high-pressure delivery pipe 30 decreases. When the fuel pressure in the high-pressure delivery pipe 30 decreases, the valve member 54 approaches the valve seat 53 by the urging force of the valve spring 55. When the valve member 54 is seated on the valve seat 53, the relief valve 52 is closed.

As a result of various experiments, the present inventor has obtained the following findings. That is, in the case in which the relief valve 52 is opened by the fuel pressure in the high-pressure delivery pipe 30 increasing to the specified pressure PDL, the relief valve 52 is not immediately closed even when the fuel pressure in the high-pressure delivery pipe 30 becomes less than the specified pressure PDL due to the outflow of the fuel in the high-pressure delivery pipe 30 through the relief valve 52. That is, when the relief valve 52 is opened, the relief valve 52 will remain open for a period of time. Thus, until the relief valve 52 is closed, the fuel pressure in the high-pressure delivery pipe 30 decreases to a level corresponding to the fuel pressure in the supply passage 26.

Detection System of Fuel Supply Device

As shown in FIG. 2, the fuel supply device 20 includes a feed pressure sensor 61 and a fuel pressure sensor 62 as a detection system. These sensors 61, 62 output signals corresponding to detection results to a control device 70, which will be described later. The feed pressure sensor 61 detects the pressure of the fuel discharged from the feed pump 25 to the supply passage 26. For example, the feed pressure sensor 61 is provided in the low-pressure delivery pipe 34. The fuel pressure sensor 62 detects the fuel pressure in high-pressure delivery pipe 30. The fuel pressure based on the output signal of the feed pressure sensor 61 is referred to as a feed pressure PFS. The fuel pressure based on the output signal of the fuel pressure sensor 62 is referred to as a delivery fuel pressure PDS. In the present embodiment, the delivery fuel pressure PDS corresponds to a fuel pressure detection value.

Control Device of Fuel Supply Device

As shown in FIG. 2, the fuel supply device 20 includes the control device 70, which controls the fuel pressure in the high-pressure delivery pipe 30 and the fuel pressure in the low-pressure delivery pipe 34. The control device 70 includes processing circuitry 71. For example, the processing circuitry 71 is an electronic control unit. In this case, the processing circuitry 71 includes a CPU 72 and a memory 73. The memory 73 stores a control program executed by the CPU 72. When the CPU 72 executes the control program, the processing circuitry 71 controls the feed pump 25 and the solenoid spill valves 44.

The processing circuitry 71 determines whether the fuel pressure sensor 62 is normal when there is a request to stop the internal combustion engine 10. Specifically, prior to stopping the internal combustion engine 10, the processing circuitry 71 increases the fuel pressure in the high-pressure delivery pipe 30 to the specified pressure PDL or greater, thereby opening the relief valve 52. Further, the processing circuitry 71 determines whether the fuel pressure sensor 62 is normal based on the result of comparison between the delivery fuel pressure PDS and the fuel pressure determination value after the fuel pressure in the high-pressure delivery pipe 30 starts to decrease as a result of opening the relief valve 52.

Sensor Determination Process

Figure 4:
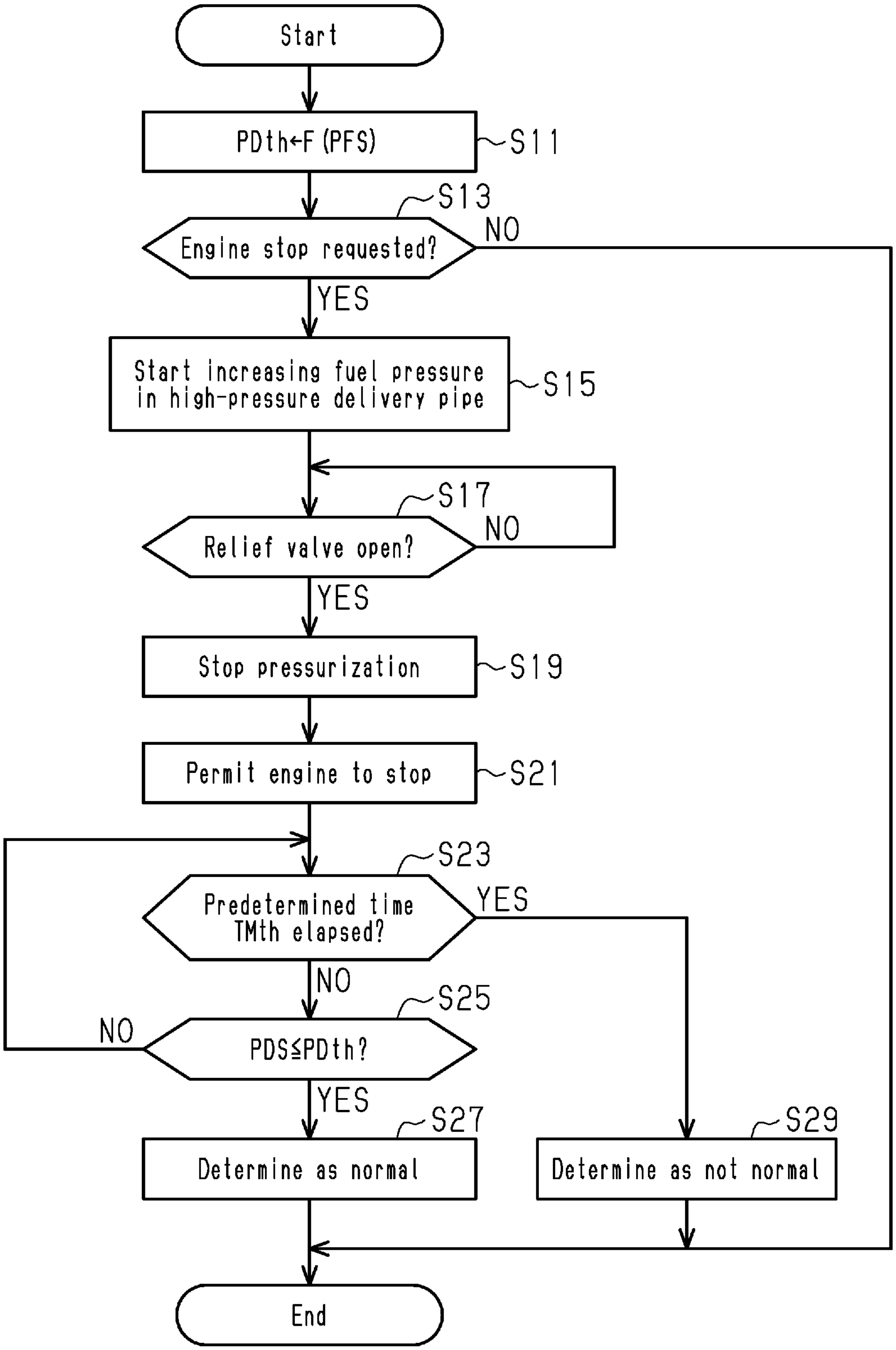
FIG. 4 is a flowchart illustrating a sensor determination process executed by the processing circuitry included in the fuel supply device of FIG. 1.

The sensor determination process executed by the processing circuitry 71 will now be described with reference to FIGS. 3 and 4. The sensor determination process includes series of processes for determining whether the fuel pressure sensor 62 is normal. FIG. 4 is a flowchart illustrating the sensor determination process. While the internal combustion engine 10 is running, the processing circuitry 71 repeatedly executes the sensor determination processing.

As shown in FIG. 4, in step S11, the processing circuitry 71 sets a fuel pressure determination value PDth to a value corresponding to the feed pressure PFS. The fuel pressure determination value PDth is a threshold value serving as a criterion for determining whether the fuel pressure sensor 62 is normal. The processing circuitry 71 sets the fuel pressure determination value PDth to a larger value as the feed pressure PFS at the moment becomes higher. The fuel pressure in the supply passage 26, to which the relief passage 51 is connected, is substantially equal to the fuel pressure in the low-pressure delivery pipe 34. This allows the processing circuitry 71 to set the fuel pressure determination value PDth to a value corresponding to the fuel pressure of the supply passage 26. For example, the fuel pressure determination value PDth is set to a pressure slightly higher than the fuel pressure of the supply passage 26.

Next, in step S13, the processing circuitry 71 determines whether there is a request to stop the internal combustion engine 10. For example, when an operation switch of the vehicle is turned off, the processing circuitry 71 determines that an engine stop request to has been made. When the processing circuitry 71 determines that an engine stop request to has been made (S13: YES), the processing circuitry 71 advances the process to step S15. When the processing circuitry 71 determines that an engine stop request has not been made (S13: NO), the processing circuitry 71 ends the current sensor determination process.

In step S15, the processing circuitry 71 starts increasing the fuel in the high-pressure delivery pipe 30 prior to stopping the internal combustion engine 10. Specifically, the processing circuitry 71 increases the amount of fuel discharged from the high-pressure fuel pump 28 by advancing the closing timing of the solenoid spill valve 44 during the upward movement of the plunger 42.

In step S17, the processing circuitry 71 determines whether the relief valve 52 has been opened due to an increase in the fuel in the high-pressure delivery pipe 30. When the relief valve 52 is opened due to an increase in the fuel pressure in the high-pressure delivery pipe 30, the fuel pressure in the high-pressure delivery pipe 30 rapidly decreases. Thus, the delivery fuel pressure PDS rapidly decreases. This allows the processing circuitry 71 to determine that the relief valve 52 has been opened when the delivery fuel pressure PDS starts to decrease after the delivery fuel pressure PDS increases. When determining that the relief valve 52 has not been opened (S17: NO), the processing circuitry 71 repeats the determination of step S17 until the relief valve 52 is determined as being opened. When determining that the relief valve 52 has been opened (S17: YES), the processing circuitry 71 advances the process to step S19.

In step S19, the processing circuitry 71 stops pressurization of the fuel by the high-pressure fuel pump 28. For example, the processing circuitry 71 keeps the solenoid spill valve 44 open by stopping power supply to the solenoid spill valve 44. In step S21, the processing circuitry 71 permits the internal combustion engine 10 to stop.

Subsequently, in step S23, the processing circuitry 71 determines whether the time elapsed from when the pressurization of the fuel by the high-pressure fuel pump 28 was stopped has reached a predetermined time TMth. When the relief valve 52 is opened by making the fuel pressure in the high-pressure delivery pipe 30 greater than or equal to the specified pressure PDL as described above, the relief valve 52 will remain for a period of time. The time from when the relief valve 52 opens to when the relief valve 52 closes can be estimated from the specifications of the fuel supply device 20. Thus, the predetermined time TMth is set in advance to a time slightly longer than the estimated value of the time from when the relief valve 52 opens to when the relief valve 52 closes.

When determining that the elapsed time has not reached the predetermined time TMth (S23: NO), the processing circuitry 71 advances the process to step S25. In step S25, the processing circuitry 71 determines whether the delivery fuel pressure PDS is less than or equal to the fuel pressure determination value PDth. When the delivery fuel pressure PDS is higher than the fuel pressure determination value PDth (S25: NO), the processing circuitry 71 returns the process to step S23. When the delivery fuel pressure PDS is less than or equal to the fuel pressure determination value PDth (S25: YES), the processing circuitry 71 advances the process to step S27.

In step S27, the processing circuitry 71 determines that the fuel pressure sensor 62 is normal. That is, when the delivery fuel pressure PDS becomes less than or equal to the fuel pressure determination value PDth before the elapsed time reaches the predetermined time TMth, the processing circuitry 71 determines that the fuel pressure sensor 62 is normal. Thereafter, the processing circuitry 71 ends the sensor determination process.

When determining in step S23 that the elapsed time is longer than the predetermined time TMth (S23: YES), the processing circuitry 71 advances the process to step S29. In step S29, the processing circuitry 71 determines that the fuel pressure sensor 62 is not normal. That is, the processing circuitry 71 determines that the fuel pressure sensor 62 is not normal when the delivery fuel pressure PDS does not become less than or equal to the fuel pressure determination value PDth even if the elapsed time becomes longer than the predetermined time TMth. Thereafter, the processing circuitry 71 ends the sensor determination process.

Operation and Advantages

The operation of the fuel supply device 20 will now be described with reference to FIG. 3.

At time t1, while the internal combustion engine 10 is running, the processing circuitry 71 receives a request to stop the internal combustion engine 10 Then, the processing circuitry 71 causes the high-pressure fuel pump 28 to increase the fuel pressure in the high-pressure delivery pipe 30 prior to the engine stop. As a result, the delivery fuel pressure PDS increases as indicated by the solid line in FIG. 3. Then, the delivery fuel pressure PDS becomes higher than the upper limit PDA of the fuel pressure range RPD. At time t2, when the fuel in the high-pressure delivery pipe 30 becomes greater than or equal to the specified pressure PDL the relief valve 52 is opened. As a result, the fuel in the high-pressure delivery pipe 30 flows out through the relief passage 51, so that the fuel pressure in the high-pressure delivery pipe 30 rapidly decreases. The processing circuitry 71 determines that the relief valve 52 is opened by monitoring the transition of the delivery fuel pressure PDS.

When the relief valve 52 is forcibly opened in this way, the relief valve 52 remains open for a period of time. As a result, the fuel continues to flow out of the high-pressure delivery pipe 30, so that the fuel pressure in the high-pressure delivery pipe 30 decreases to a level corresponding to the fuel pressure in the supply passage 26.

In the fuel supply device 20, the fuel pressure determination value PDth is set to a value corresponding to the fuel pressure in the supply passage 26. Thus, when the fuel pressure sensor 62 is normal, the relief valve 52 is opened to reduce the delivery fuel pressure PDS to the fuel pressure determination value PDth or less. When the fuel pressure sensor 62 is not normal, there may be a case in which the delivery fuel pressure PDS does not become less than or equal to the fuel pressure determination value PDth even if the relief valve 52 is opened.

Thus, the fuel supply device 20 determines whether the fuel pressure sensor 62 is normal based on the comparison result between the delivery fuel pressure PDS and the fuel pressure determination value PDth after the fuel pressure in the high-pressure delivery pipe 30 starts to decrease due to the opening of the relief valve 52.

When the relief valve 52 is opened and then closed as described above, the actual value of the fuel pressure in the high-pressure delivery pipe 30 becomes substantially equal to the fuel pressure in the supply passage 26. Thus, when the fuel pressure sensor 62 is normal, the delivery fuel pressure PDS becomes less than or equal to the fuel pressure determination value PDth. Accordingly, when the delivery fuel pressure PDS becomes less than or equal to the fuel pressure determination value PDth, the processing circuitry 71 determines that the fuel pressure sensor 62 is normal. When the delivery fuel pressure PDS does not become less than or equal to the fuel pressure determination value PDth, there is a possibility that a deviation occurs between the delivery fuel pressure PDS and the actual value of the fuel pressure in the high-pressure delivery pipe 30. Thus, when the delivery fuel pressure PDS does not become less than or equal to the fuel pressure determination value PDth, the processing circuitry 71 determines that the fuel pressure sensor 62 is not normal.

The above embodiment provides the following advantages.

(1) In recent years, it has been considered to increase the upper limit PDA of the fuel pressure range RPD in order to improve the exhaust properties of the internal combustion engine. When the upper limit PDA is increased, the relief valve 52 is designed to increase the specified pressure PDL such that the relief valve 52 remains closed while the internal combustion engine is not running.

Conventionally, when anomaly determination of fuel pressure sensor 62 is performed, the fuel pressure in high-pressure delivery pipe 30 is not intentionally increased immediately before stopping the internal combustion engine 10. That is, while the engine is not running, the fuel pressure in the high-pressure delivery pipe 30 increases due to heat received from the internal combustion engine 10. When the fuel pressure reaches the specified pressure PDL due to the increase in the fuel pressure caused by the heat reception, the fuel in the high-pressure delivery pipe 30 flows out through a slight gap between the valve seat 53 and the valve member 54 of the relief valve 52. As a result, the fuel pressure in the high-pressure delivery pipe 30 gradually decreases. When a predetermined time elapses after the engine is stopped, the fuel pressure in the high-pressure delivery pipe 30 decreases to a level corresponding to the fuel pressure in the supply passage 26. Thus, whether the fuel pressure sensor 62 is normal is determined by comparing the delivery fuel pressure PDS with the fuel pressure determination value at the next start of the internal combustion engine 10.

However, if the specified pressure PDL is set relatively high as described above, there may be a possibility that the fuel pressure in the high-pressure delivery pipe 30 does not increase to the specified pressure PDL while the internal combustion engine 10 is not running. In this case, there is a possibility that the fuel in the high-pressure delivery pipe 30 hardly flows out to the outside while the engine is not running. As a result, it cannot be determined whether the fuel pressure sensor 62 is normal.

In this regard, in the present embodiment, the relief valve 52 is forcibly opened by increasing the fuel pressure in the high-pressure delivery pipe 30 before stopping the internal combustion engine 10. Thus, when the internal combustion engine 10 is stopped, the fuel pressure in the high-pressure delivery pipe 30 is reduced to a level corresponding to the fuel pressure in the supply passage 26. This allows the fuel supply device 20 to determine whether the fuel pressure sensor 62 is normal when the internal combustion engine 10 is stopped.

(2) The processing circuitry 71 sets the fuel pressure determination value PDth to a larger value as the fuel pressure in the supply passage 26 becomes higher. Thus, in the fuel supply device 20, the accuracy of determining whether the fuel pressure sensor 62 is normal is prevented from varying depending on the magnitude of the fuel pressure in the supply passage 26.

(3) In the fuel supply device 20, the relief passage 51 is connected to the supply passage 26. Thus, by opening the relief valve 52, the fuel supply device 20 reduces the fuel pressure in the high-pressure delivery pipe 30 to a level corresponding to the fuel pressure in the supply passage 26.

There may be a case where the relief passage is connected to the pressurizing chamber 45 instead of the supply passage 26 In this case, when the fuel is pressurized by the high-pressure fuel pump 28, the fuel in the pressurizing chamber 45 and the relief passage is pressurized. In the fuel supply device 20 of the present embodiment, since the relief passage 51 is not connected to the pressurizing chamber 45, the fuel in the relief passage 51 is not pressurized when the fuel is pressurized by the high-pressure fuel pump 28. This allows the high-pressure fuel pump 28 to efficiently increase the fuel pressure in the high-pressure delivery pipe 30.

Modifications

The above embodiment may be modified as follows. The above embodiment and the following modifications can be combined as long as the combined modifications remain technically consistent with each other.

The relief passage may be connected to the pressurizing chamber 45 of the high-pressure fuel pump 28 instead of the supply passage 26.

The fuel pressure determination value PDth may be a fixed value set in advance.

The high-pressure fuel pump 28 is not limited to an engine-driven pump as shown in FIG. 2 if it can increase the fuel pressure in the high-pressure delivery pipe 30. For example, the high-pressure fuel pump 28 may be a pump that causes the plunger 42 to reciprocate in the cylinder 41 by operation of an electric actuator.

The fuel supply device may maintain the fuel pressure in the supply passage 26 at a predetermined fuel pressure. In this case, the fuel pressure determination value PDth is preferably maintained at a value corresponding to the predetermined fuel pressure.

The processing circuitry 71 is not limited to a device that includes a CPU and a ROM and executes software processing. That is, the processing circuitry 71 may have any one of the following configurations (a), (b), (c).

(a) The processing circuitry 71 includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The processing circuitry 71 includes one or more dedicated hardware circuits that execute various processes. The dedicated hardware circuits include, for example, an application specific integrated circuit (ASIC) and a field programmable gate array (FPGA).

(c) The processing circuitry 71 includes one or more processors that execute part of various processes in accordance with a computer program and one or more dedicated hardware circuits that execute the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A fuel supply device configured to supply fuel to an internal combustion engine, the fuel supply device comprising:

a fuel injection valve configured to inject the fuel supplied to the internal combustion engine;

a delivery pipe configured to store the fuel supplied to the fuel injection valve;

a fuel pump configured to pressurize the fuel and forcibly deliver the fuel to the delivery pipe;

a fuel tank configured to store the fuel;

a supply passage through which the fuel supplied from the fuel tank to the fuel pump flows;

a relief valve configured to open in response to a fuel pressure in the delivery pipe becoming greater than or equal to a specified pressure, thereby allowing the fuel in the delivery pipe to flow out;

a fuel pressure sensor configured to detect a fuel pressure in the delivery pipe; and processing circuitry, wherein the fuel pressure in the delivery pipe based on an output signal of the fuel pressure sensor is a fuel pressure detection value, and upon receiving a request to stop the internal combustion engine, the processing circuitry is configured to:

open the relief valve by increasing the fuel pressure in the delivery pipe to the specified pressure or greater before stopping the internal combustion engine; and stop pressurization of the fuel by the fuel pump in response to opening of the relief valve; and determine whether the fuel pressure sensor is normal based on a result of comparison between the fuel pressure detection value and a fuel pressure determination value after the fuel pressure in the delivery pipe starts to decrease as a result of opening the relief valve, the fuel pressure determination value being set to a value corresponding to a fuel pressure in the supply passage, wherein the processing circuitry is configured to determine that the fuel pressure sensor is normal when the fuel pressure detection value becomes less than or equal to the fuel pressure determination value before an elapsed time exceed a predetermined time, the elapsed time being a time elapsed from when the pressurization of the fuel by the fuel pump was stopped, and the predetermined time being set to correspond to a time from when the relief valve opens to when the relief valve closes, the processing circuitry is configured to determine that the fuel pressure sensor is not normal when the fuel pressure detection value does not become less than or equal to the fuel pressure determination value even if the elapsed time exceeds the predetermined time.

2. The fuel supply device according to claim 1, further comprising:

a feed pump configured to pump the fuel from the fuel tank and discharge the fuel to the supply passage, wherein the fuel pressure determination value is set to a larger value as the fuel pressure in the supply passage becomes higher.

3. The fuel supply device according to claim 1, further comprising:

a forced delivery passage configured to guide the fuel that has been discharged from the fuel pump to the delivery pipe; and a relief passage that bypasses the fuel pump and connects the forced delivery passage and the supply passage, wherein the relief valve is located in the relief passage.

* * * * *